S. G. THOMSON.
HUB LINER.
APPLICATION FILED OCT. 4, 1915.

1,169,057.

Patented Jan. 18, 1916.

2 SHEETS—SHEET 1.

WITNESSES
R. A. Balderson
J. B. Fleming

INVENTOR
S. G. Thomson
by Bakewell, Byrnes & Parmelee
Attys.

S. G. THOMSON.
HUB LINER.
APPLICATION FILED OCT. 4, 1915.

1,169,057.

Patented Jan. 18, 1916.
2 SHEETS—SHEET 2.

WITNESSES
R. A. Balderson
J. B. Bleming

INVENTOR
S. G. Thomson
by Bakewell, Byrnes & Parmelee
Attys.

UNITED STATES PATENT OFFICE.

SAMUEL G. THOMSON, OF READING, PENNSYLVANIA.

HUB-LINER.

1,169,057.   Specification of Letters Patent.   Patented Jan. 18, 1916.

Application filed October 4, 1915. Serial No. 54,058.

*To all whom it may concern:*

Be it known that I, SAMUEL G. THOMSON, a citizen of the United States, residing at Reading, in the county of Berks and State of Pennsylvania, have invented a new and useful Improvement in Hub-Liners, of which the following is a full, clear, and exact description, reference being had to the accompanying drawings, forming part of this specification, in which—

Figure 1:
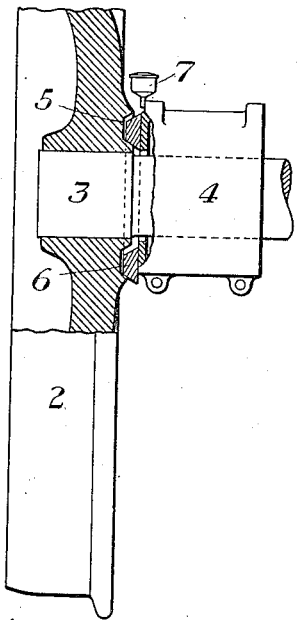
Figure 16:
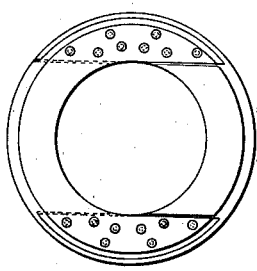
Figure 17:
Figure 18:
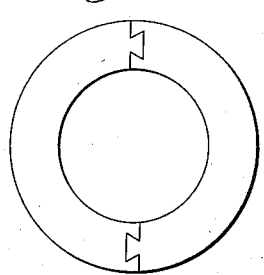
Figure 19:
Figure 20:
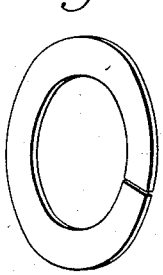

Figure 1 is a side elevation, partially in section, of a portion of a wheel and a portion of a journal box for railway cars. Figs. 2 to 15 are similar views showing various modified forms. Fig. 16 is a side elevation of another modified form of ring made up in sections. Fig. 17 is an edge view thereof. Fig. 18 is a view similar to Fig. 16 of another form of ring. Fig. 19 is an edge view thereof, and Fig. 20 is a perspective view of another form of ring.

This invention relates to an improvement in hub liner rings, and is more particularly designed to be used in connection with the wheels of railway cars or locomotives and the journal boxes for the axles.

The object of my invention is to provide a cheap and simple device of this character which can readily be placed in position, some of the forms being adapted to be applied without removing the wheel from its axle or shaft, and which is designed to reduce the friction between the rotary member or wheel and the journal box.

My invention is particularly effective in connection with wheels on the guiding trucks of locomotives, where the side thrust is transferred from the flange of the wheel to the wheel hub, and thence to the journal box, when guiding a locomotive around curves at high speed.

As is well known to those familiar with the art, modern locomotives are provided with a very long rigid wheel base, and usually a large amount of lateral play is allowed between the wheel hubs and the journal boxes to avoid binding when the locomotive passes over curves. This lateral thrust of the wheel against the journal boxes increases the wear between these parts to such an extent that the locomotive becomes dangerous and jerky in rounding curves at high speed. It is therefore very advantageous to reduce the friction between these parts by inserting revolving rings, which will overcome some of the friction and which will also keep the thrust faces well lubricated.

With my floating rings a little more lateral play can be allowed between the hub and box than is the usual practice, since very little allowance need be made for these parts loosening up after wear takes place. This reduction of wear is a very valuable feature, as it reduces the necessity of taking wheels from under locomotives at frequent intervals for the purpose of lining up the hubs and boxes to the proper clearance dimensions. The average practice is to allow about three thirty-seconds of an inch clearance for each wheel, or in other words, the distance between the hubs of a pair of wheels is three sixteenth of an inch greater than the distance over the outside of the two journal boxes for the axle. In the ordinary practice of today, this clearance very rapidly cuts out to excessive dimensions, depending on the length of the rigid wheel base of the locomotive, speed, and the radii of the curves around which it is operated. Great frictional heat is also generated, causing hot boxes, until such time as the parts sufficiently free themselves. Even after the wheel hubs have cut out to afford sufficient clearance, the ordinary thrust in guiding the large inertia of the locomotive causes excessive wear, and the wear increases as the clearance increases, on account of the excessive added thrust due to lost motion.

By the use of devices such as shown and described by me, hub clearance can be properly maintained, with little or no wear; and heating from this cause can be largely reduced.

The precise nature of my invention will be best understood by reference to the accompanying drawings, which will now be described, it being premised, however, that various changes may be made in the details of construction, as well as the arrangement of the parts, without departing from the spirit and scope of my invention as defined in the appended claims.

Referring to the accompanying drawings, the reference character 2 designates the wheels, 3 the axle to which the wheels are secured, and 4 the journal boxes for the axles. These reference characters have been applied to similar parts in Figs. 1 to 15.

In Fig. 1 I have provided the wheel 2 with an annular groove 5 having outwardly sloping walls, and 6 designates a liner ring seated within the groove 5 and which is adapted to rotate relative to the box 4 and the wheel 2, and to engage the side of the journal box 4 and the bottom of the groove 5 when the wheel is thrust endwise toward the journal box. When, however, the wheel is running normally, as when running upon a straight track, the journal boxes will approximately assume a central postion relative to the wheels, and when in this position the ring 6 will drop downwardly as shown in Fig. 1, so as to lie against the outer face of the journal box, and thereby form a closure for the opening in the journal box and prevent dust from entering the journal box, and at the same time prevent dust from settling on the side or thrust face of the journal box. When the side play between the wheel and box is taken up by thrust, the ring is raised by the flaring edge of the groove 5 and fills up the entire space between the bottom of the groove and the box. The ring will then turn in the groove or on the box, the rotation depending on the face offering the least resistance.

In some of the figures I have shown an oil cup such as indicated at 7 for lubricating the groove, and the side walls of the ring and the journal box.

Figure 2:
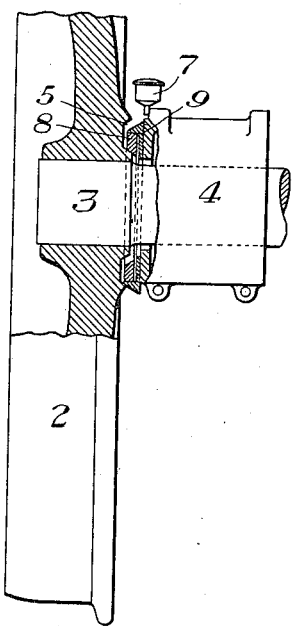

In Fig. 2 I have shown two coacting rings of different material, the ring 8 being carried by the bevel edge of the groove 5, and which ring in turn carries another ring member 9. These rings may act separately or together, in their lateral movement; the tendency being for both to slide downwardly against the face of the box when the parts are in normal position.

Figure 3:
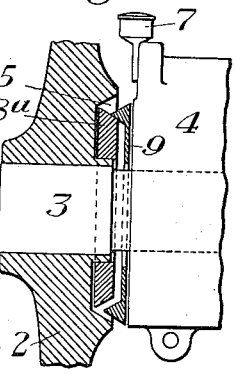

In Fig. 3 I have also shown two rings $8^a$ and 9, but in this construction the ring $8^a$ normally rents in the bottom of the groove 5, while the ring 9 moves downwardly over the beveled edge of the ring $8^a$ and is held in contact with the side wall of the journal box, so that there is normally a space between the two rings when the locomotive is running on a straight track, or when there is no lateral thrust. When, however, there is a lateral thrust toward the journal box, the two rings will be brought together and both rings may rotate together, or may rotate relative to each other.

Figure 4:
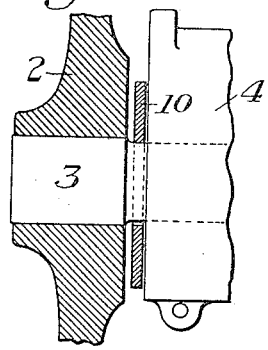

In Fig. 4 I have shown a structure in which I use a single ring 10, which is loosely mounted on the axle, and which is one of the simplest forms of my improvement.

Figure 5:
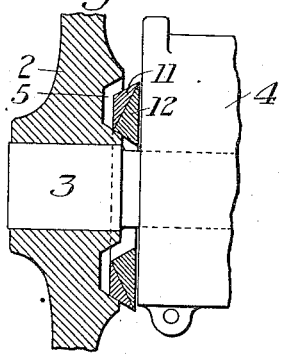

In Fig. 5 I have shown an arrangement somewhat similar to that shown in Fig. 1, but in which the ring is made up of a plurality of members 11 and 12 which may be made of the same or of different material.

Figure 6:
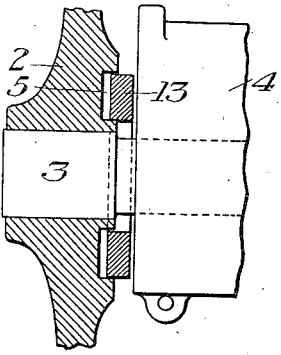

In Fig. 6 I have shown a ring similar to that shown in Fig. 5, but in which the ring 13 is seated in a groove 5 in the wheel, the walls of which are parallel to each other.

Figure 7:
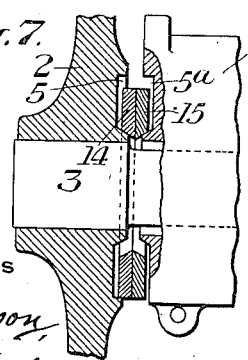

In Fig. 7 I have shown a plurality of rings somewhat similar to the rings shown in Fig. 1, in which the ring 14 lies within the groove 5 in the wheel 2, while the ring 15 lies within a groove $5^a$ in the journal box.

Figure 8:
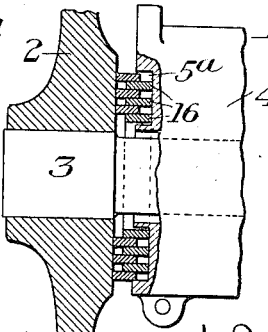

In Fig. 8 I have shown a plurality of telescopic rings 16, which lie within the groove $5^a$ in the journal box, the innermost ring being supported on the inner wall of the groove, while the remainder of the rings are supported one upon each other. In a construction of this character the rings may be split so as to be readily slipped over the axle in order to build up a ring of dimensions such that it could not be placed around the axle without taking the wheel off the axle. The individual rings may or may not move relative to each other, and by the use of a large number of rings of this character, a large contacting surface is provided which will hold a large supply of lubricating material when the rings become thoroughly saturated.

Figure 9:
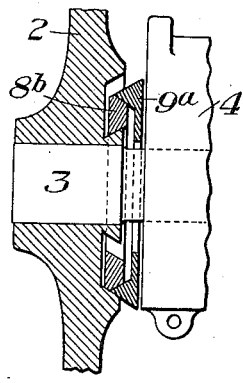

In Fig. 9 I have shown a construction similar to that shown in Fig. 3, but in which the groove in the wheel is provided with a reëntrant angle at its inner edge which holds the ring $8^b$ against the face of the wheel, while the ring $9^a$ will be held against the face of the journal box. As the friction of the ring $9^a$ against the journal box is greater than its friction against the ring $8^b$, it will naturally remain stationary with relation to the box, allowing the other ring to ride over it in the wheel, and thereby keep the parts well lubricated.

Figure 10:
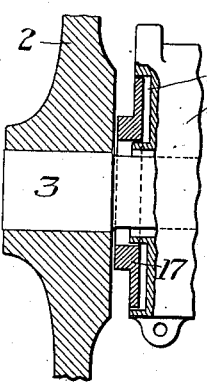

In Fig. 10 the journal box is provided with a rectangular groove $5^a$ and a ring 17 having a portion completely filling the groove. This ring is provided with an annular flange surrounding the opening therein, which forms the thrust bearing against which the hub of the wheel is brought to bear when the wheel is thrust toward the journal box. This construction provides large friction surfaces between the box and the ring which have a tendency to hold the ring stationary with the box, while the friction against the wheel hub is around the flange surrounding the opening, where the peripheral speed is the lowest, and thereby greatly eliminate heat by friction. This construction is very desirable in heavy locomotives of high speed.

Figure 11:
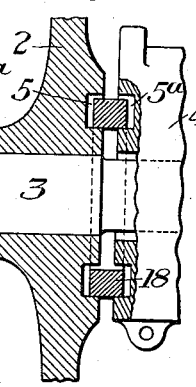

In Fig. 11 I have shown a substantially square ring 18 in grooves 5 and $5^a$ in the wheel and journal box respectively.

Figure 12:
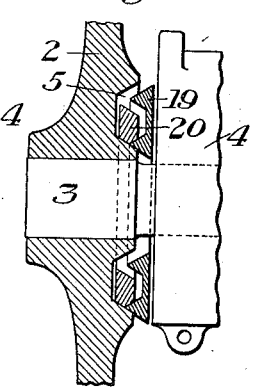

Fig. 12 shows a construction in which two coacting ring members are adapted to enter the groove 5 in the wheel, the ring 19 being provided with a groove having flaring walls which are adapted to receive a ring 20 when the parts are brought into engagement with each other. In this construction the groove in the ring 19 is so arranged that the ring members will move away from each other under normal conditions, and thereby provide a large space between the ring members for the lubricant.

Figure 13:
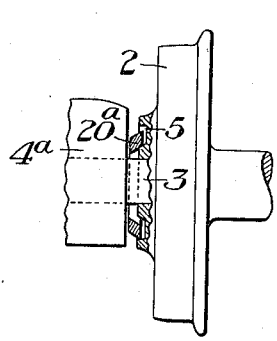

Fig. 13 illustrates a form in which the journal box is located on the outside of the wheel on the projecting end of the axle, similar to that used in the journal boxes of car construction, and in which the wheel hub is provided with a groove 5 similar to that shown in Fig. 1 for the reception of the ring 20ª.

Figure 14:
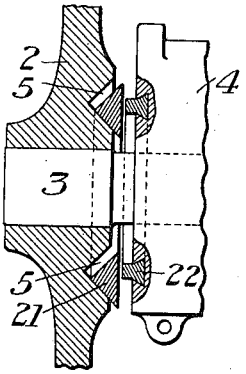

In Fig. 14 the groove 5 is V-shaped, for the reception of a ring 21, and 22 is a hardened ring inserted in the face of the journal box. In this construction the ring 21 tends to move downwardly toward the axle against the face of the hardened ring 22 when the parts separate.

Figure 15:
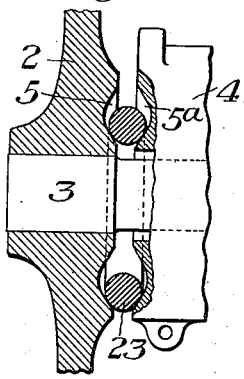

In Fig. 15 I have shown a ring 23 of circular cross section in grooves 5 and 5ª in the wheel and journal box respectively.

In Figs. 16 and 17 I have shown a ring made up of two parts, each of which is provided with reduced portions which are overlapped by reduced portions on the other member, and the reduced portions of the two members being secured together by means of rivets.

In Figs. 18 and 19 I have shown a ring made up of two members which are divided in a radial line, each of the members having a tongue which enters an undercut groove in the other member.

In Fig. 20 I have shown a ring which has been split in a radial line, so that the edges at the split can be spread apart to insert the ring into position.

In the drawings I have shown various modified forms of ring members and grooves, but it will readily be understood that other forms may be made which will be just as efficient, the shape of the ring and groove being determined by the conditions. It will also be understood that the rings can be made of various materials, dependent upon the service and conditions. These rings may be made in one piece and turned to size, and then placed in position by removing the wheels from the axles; or by making the rings in split or built-up form so that they can be placed over the axle without removing the wheel; or it may be possible to make the rings by placing a form about the grooves for the reception of the rings and then casting the rings in the grooves of the wheels, and then turning off the faces of the rings when necessary to make them fit the grooves and side walls of the boxes. By this method, also, I am enabled to replace rings without removing wheels from the axles.

The major portion of the drawings illustrate the hub liner rings applied to wheels of railway cars and locomotives, although it will readily be understood that liners of this character can be used on any device having a stationary and a rotary member which are subjected to thrusts.

The advantages of my invention result from the provision of liner rings which will reduce the friction between the wheel and the journal box, and which are so arranged that the parts subjected to wear will always be well lubricated. Furthermore, from the provision of rings of this character in which the contacting faces between the ring and the other parts are so arranged that the ring will normally close the space between the box and the wheel and thereby keep dust and dirt from the journal box and the friction surfaces.

I claim:

1. The combination of a wheel and a journal box, of a loose ring arranged between the journal box and the wheel, and adapted to rotate freely relative to the wheel about its axis, said ring having a carrying portion projecting beyond one of the vertical hub faces of the wheel or journal box.

2. The combination of a wheel, an axle and a journal box, and a loose ring between the journal box and the wheel arranged to rotate freely relative to the wheel about its axle, said ring having a conical face.

3. The combination of a wheel, an axle and a journal box, and a loose ring between the journal box and the wheel arranged to rotate about the axle and carried free of the axle, said ring having a conical face.

4. The combination of a wheel, an axle and a journal box, and a loose ring between the wheel and the journal box arranged to revolve around the axle, said ring being arranged to rotate freely relative to the wheel about its axis, and a circular face carrying the ring free of the axle.

5. The combination of a wheel and an axle, of a journal box for said axle, a loose ring arranged to revolve about the axle between the wheel and the journal box, said ring being arranged to rotate freely relative to the wheel, and a circular face spaced at a substantial distance from the axle for supporting the ring.

6. The combination of a wheel and an axle, of a journal box for said axle, and a loose ring arranged to revolve about the axle between the wheel and the journal box, said ring having a conical face, there being a groove for the reception of said ring, one of the walls of said groove having a circular face lying in a plane at an angle parallel with said conical face.

7. The combination of a wheel and an axle, of a journal box for the axle, and a loose ring arranged to revolve around the axle between the wheel and the journal box, said ring having a parallel face around its circumference forming an acute angle with the flat face of said ring.

8. The combination of a wheel and an axle, of a journal box for the axle, and a loose ring arranged to revolve around the axle between the wheel and the journal box, said ring having a parallel face around its circumference forming an acute angle with the flat face of said ring, there being an annular groove in the wheel having a circular face parallel with the acute angle face of the ring.

9. The combination of a wheel and an axle, of a journal box for said axle, and a plurality of loose coacting rings arranged to rotate coördinately about the axle between the wheel and the journal box.

10. The combination of a wheel and an axle, of a journal box for said axle, and a plurality of loose coacting rings arranged to rotate about the axle between the wheel and the journal box, there being a groove for the reception of one of the rings, and means on said last mentioned ring for supporting the other rings.

11. The combination of a wheel and an axle, of a journal box for said axle, a plurality of loose rings arranged to revolve around the axle between the wheel and the journal box, said rings having coacted conical faces.

12. The combination of a wheel and an axle, of a journal box for said axle, there being an annular groove in the wheel having a conical wall, and a loose ring mounted in said groove between the wheel and the journal box.

13. The combination of a wheel and an axle, of a journal box for said axle, there being an annular groove in the wheel having a conical wall, and a plurality of rings between the wheel and the journal box, one of said rings having a sloping face for engaging the conical face of the wall of the groove, and means on the last mentioned ring for supporting another ring.

In testimony whereof I have hereunto set my hand.

SAMUEL G. THOMSON.

Witnesses:
J. J. BEST,
HARRY EGOLF.